(12) United States Patent
Mistely

(10) Patent No.: US 7,523,297 B1
(45) Date of Patent: Apr. 21, 2009

(54) SHADOW SCAN DECODER

(75) Inventor: Roger C. Mistely, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 629 days.

(21) Appl. No.: 11/229,406

(22) Filed: Sep. 16, 2005

(51) Int. Cl.
*G06F 7/38* (2006.01)
*G06F 9/00* (2006.01)
*G06F 9/44* (2006.01)

(52) U.S. Cl. .................. 712/227; 712/214; 712/220; 718/107; 718/102; 718/100; 710/260; 700/26

(58) Field of Classification Search ............... None
See application file for complete search history.

(56) References Cited

U.S. PATENT DOCUMENTS

| | | | |
|---|---|---|---|
| 6,157,210 A * | 12/2000 | Zaveri et al. ............... | 326/40 |
| 6,363,443 B1 * | 3/2002 | Whetsel ...................... | 710/104 |
| 6,481,000 B1 * | 11/2002 | Zaveri et al. ................. | 716/17 |
| 7,266,489 B2 * | 9/2007 | Hunt et al. ................... | 703/14 |
| 2002/0177990 A1 * | 11/2002 | Sample ....................... | 703/28 |
| 2004/0111653 A1 * | 6/2004 | Arimilli et al. .............. | 714/25 |

\* cited by examiner

*Primary Examiner*—Cynthia Britt
*Assistant Examiner*—Guerrier Merant
(74) *Attorney, Agent, or Firm*—Martine Penilla & Gencarella LLP

(57) ABSTRACT

Methods and circuitry for processing a shadow scan instruction in a multi-threaded microprocessing environment include a bit sequence having a thread identifier, core identifiers and a shadow scan instruction. The core identifiers are assigned a state to identify microprocessor cores of a multi-core structure and are processed combinationally to determine if the shadow scan instruction is to be processed through a thread of the identified core. The processing of the shadow scan instruction through the thread of each of the identified cores is accomplished by a single load operation of the shadow scan instruction into the JTAG TAP controller.

20 Claims, 5 Drawing Sheets

SHADOW SCAN DECODER

BACKGROUND OF THE INVENTION

1. Field of the Invention

The present invention relates generally to integrated circuit design and testing, and more specifically to a TAP-based method of extracting shadow scan data without the need to load separate instructions for each multiprocessor core.

2. Description of the Related Art

In the testing of integrated circuits and circuit devices, a number of shadow scan registers are implemented in a multi-threaded, multi-core environment for non-destructive examination of system operating state. In typical test access port (TAP) shadow scan operation, separate instructions are required to obtain shadow scan data from each core.

Shadow scan testing involves the copying of data from a functional register into a shadow scan register. A snap instruction captures the data existing in a designated functional register at the time of snap, and copies the data into a shadow register. The shadow register data is output for examination and verification of the data expected to have been in the functional register at the time of the snap instruction. Shadow scan is typically implemented to allow non-destructive examination of selected system state elements while an application is in flight.

In a typical multi-threaded environment, shadow registers are implemented in scan chain logic of varying length, but shadow registers are not exclusive to or limited to scan chain implementation. Typically, when a Joint Test Action Group (JTAG) test access port (TAP) controller, implemented in the control test unit (CTU), is used to issue a shadow scan instruction, a separate instruction is required for each core, and the decoding of the thread identification is performed in the core. In this manner, the shadow scan instruction is issued through the TAP controller for a specific core (in a multi-core environment), and the thread identification is performed in the core when the instruction is executed.

In light of the foregoing, a method and circuit design is desired to enable a TAP-based method of extracting shadow scan data in a multi-threaded, multi-core environment without the need to load separate instructions for each core.

SUMMARY OF THE INVENTION

Broadly speaking, the present invention fills these needs by providing logic utilized by the JTAG defined state machine of the TAP controller to execute shadow scan of from one to a plurality of cores in a multi-threaded, multi-core structure without requiring a separate instruction to be loaded for each core. It should be appreciated that the present invention can be implemented in numerous ways, including as a process, an apparatus, a system, a device, or a computer implemented method. Several inventive embodiments of the present invention are described below.

In one embodiment, a method for processing a shadow scan instruction in a multi-threaded microprocessing environment is provided. The method includes receiving a bit sequence that includes a thread identifier and core identifiers. The bit sequence further includes a shadow scan instruction. The core identifiers are assigned a state to identify microprocessor cores of a multi-core structure in which the shadow scan instruction is to be executed. Additionally, the method includes processing the core identifiers. Each core identifier is analyzed to determine if the shadow scan instruction is to be processed through a thread of the identified core. The thread is identified by the thread identifier. The method then includes combinationally examining the core identifiers. If the examination indicates that the identified core is active, the method provides for proceeding with the processing of the shadow scan instruction through the thread of the identified core. If the examination indicates that the identified core is not active, the method provides for moving to the examination of the next core identifier. The processing of the shadow scan instruction through the thread of the identified cores is accomplished by a single load operation of the shadow scan instruction.

In another embodiment, a circuit including logic for processing a shadow scan instruction in a multi-threaded environment is provided. The circuit includes a controller for receiving a bit sequence that includes a thread identifier and core identifiers. The bit sequence further includes a shadow scan instruction, and the core identifiers are assigned a state to identify one or more cores in which the shadow scan instruction is to be executed. The circuit also includes a shadow scan active register for holding the core identifiers received from the controller, and a priority encoder to manage analysis of the core identifiers in the shadow scan active register, and to interface with from one to a plurality of cores. Further, the circuit includes deactivation logic which is interfaced with the shadow scan active register and configured to receive control from the controller and feedback from the priority encoder. The controller processes the core identifiers to determine if the shadow scan instruction is to be processed through a thread of a corresponding core.

In a further embodiment, a computer readable medium having program instructions for processing a shadow scan instruction in a multi-threaded microprocessing environment is provided. The computer readable medium includes program instructions for receiving a bit sequence that includes a thread identifier, a plurality of core identifiers, and a shadow scan instruction. The plurality of core identifiers are assigned a state of "selected" or "not selected" for each of a corresponding microprocessor core of a multi-core structure in which the shadow scan instruction is to be executed. Further, program instructions are provided for processing the plurality core identifiers. Each one of the plurality of core identifiers is analyzed to determine the state. The thread is identified by the thread identifier. Also provided are program instructions for combinationally examining the plurality of core identifiers. If the state is "selected," the program instructions provide for proceeding with the processing of the shadow scan instruction through the thread of the corresponding microprocessor core. If the state is "not selected," program instructions provide for moving to the examination of the next core identifier. The processing of the shadow scan instruction through the thread of the identified cores is accomplished by a single load operation of the shadow scan instruction.

The advantages of the present invention over the prior art are numerous and will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

An invention for a method and circuit design providing TAP-based access to logic for executing a shadow scan of up to a plurality of microprocessor cores in a multi-threaded, multi-core environment from a single shadow scan instruction. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Embodiments of the present invention provide for TAP-based execution of shadow scan instructions in a multi-core, multi-thread environment with a single instruction executing a shadow scan on up to all configured cores. Scan chain logic is utilized for illustration as exemplary implementation of embodiments of the present invention, but it should be appreciated that embodiments of the present invention are capable of implementation in generally all types of shadow scan structures and configurations.

Figure 1A:
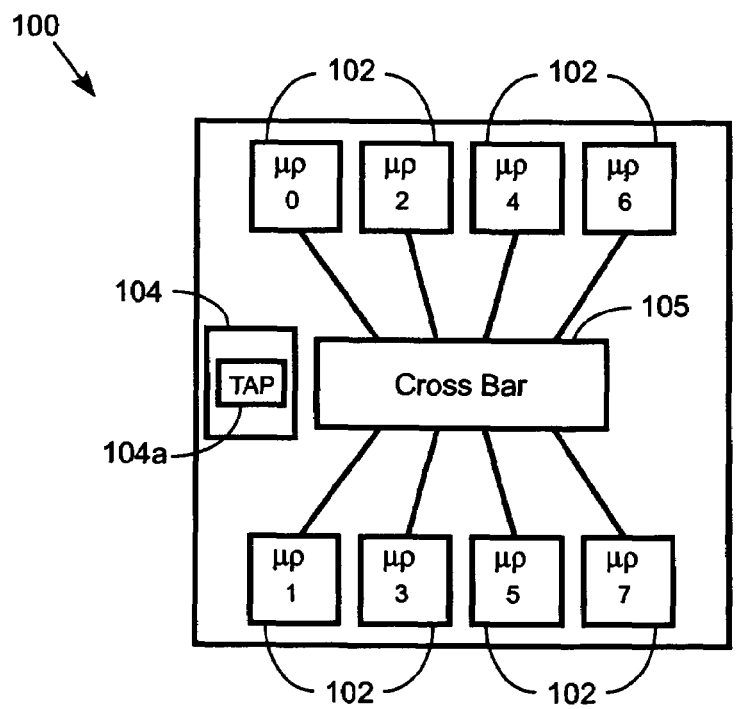
FIG. 1A is a simple diagram of a multi-core chip having four cores in an upper region, and four cores in a lower region, with a connecting cross-bar interconnecting the individual cores.

FIG. 1A is a simple diagram of a multi-core chip 100 having four cores 102 in an upper region, and four cores 102 in a lower region, with a connecting cross-bar 105 interconnecting the individual cores 102. A control test unit (CTU) 104 incorporates the Joint Test Action Group (JTAG) test access port (TAP) controller 104a, hereinafter referred to as TAP 104a. It should be appreciated that FIG. 1 is a schematic illustration that is not drawn to scale, and the logic of an actual chip is dispersed throughout the structure.

As will be discussed in greater detail below in reference to FIG. 2A, TAP 104a includes a state machine defined by JTAG standard. Embodiments of the present invention utilize TAP 104a state machine with inventive logic to execute a shadow scan of up to all cores of a multi-threaded, multi-core chip, with a single shadow scan instruction.

Figure 1B:
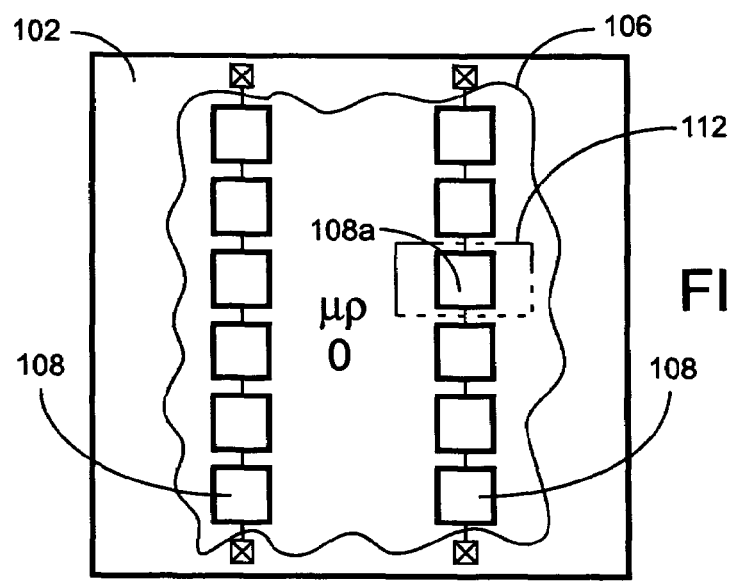
FIG. 1B illustrates a single microprocessing core including combinational logic within microprocessing core, as well as scan chain logic.
Figure 1C:
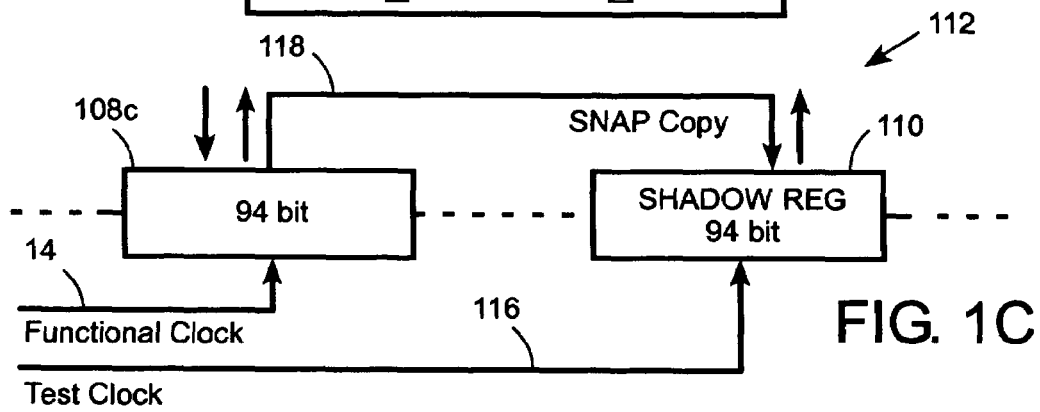
FIG. 1C shows a detail view of the functional register and shadow scan register association.

FIG. 1B illustrates a single microprocessing core 102 including combinational logic 106 within microprocessing core 102, as well as scan chain logic 108. In a typical configuration, a shadow register might be associated with a functional register 108a, for example at 112. FIG. 1C shows a detail view 112 of an exemplary association of a functional register 108a and a shadow scan register 110. Exemplary functional register 108a is a 94-bit register operating on functional clock signal 114. Exemplary shadow scan register 110 is a corresponding 94-bit register operating on test clock signal 116. A snap signal 118 captures and copies the data of functional register 108a into shadow register 110.

Figure 2A:
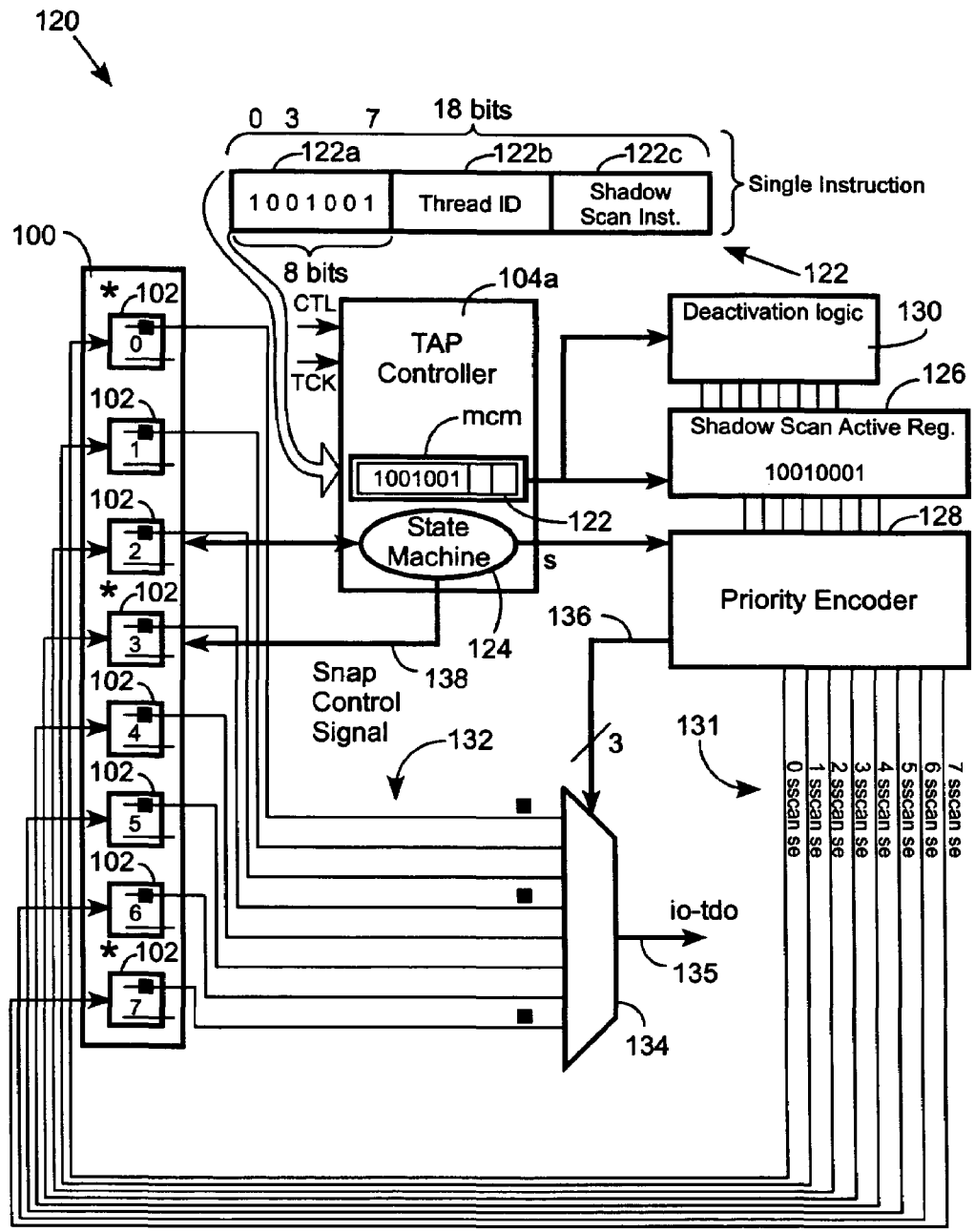
FIG. 2A is a schematic of shadow scan encoding in accordance with an embodiment of the present invention.

FIG. 2A is a schematic 120 of shadow scan encoding in accordance with an embodiment of the present invention. TAP controller 104a receives a shadow scan instruction 122, which is interpreted by state machine 124, executing a shadow scan in up to each of 8 microprocessor cores 102 of multi-core chip 100. In one embodiment, shadow scan instruction 122 is an 18-bit word, having at least three primary fields of interest. An 8-bit field 122a known as the shadow scan configuration bits identifies those cores in which the shadow scan instruction is to be executed. A 4-bit thread identifier field 122b designates the thread that is to be running in the core when the shadow scan is executed. In one embodiment, each core comprises up to four threads, and the thread identifier field 122b designates a particular one of the four threads to be running for the shadow scan operation. In one embodiment, the same thread is to be running in each core for the shadow scan. Another field of the shadow scan instruction 122 is a 4-bit field containing the instruction for the shadow scan 122c.

In one embodiment of the invention, the shadow scan instruction 122 is entered into an instruction register in TAP 104a. In one embodiment, the instruction is an 18-bit instruction register. TAP 104a includes a state machine 124 defined by JTAG standard, and in accordance with embodiments of the present invention, the state machine 124 is utilized to execute the shadow scan instruction in each of the selected cores 102, without having to load a separate instruction for each core 102.

As illustrated in schematic 120, a shadow scan instruction 122 is entered into the shadow scan instruction register of TAP 104a. In one embodiment of the invention, the shadow scan instruction 122 is executed by TAP 104a interpreting the designated thread to be running during shadow scan. TAP 104a controls the thread selection for each of the multiprocessor cores 102, and then issues a global snap signal 138 to multi-core processor 100. In each microprocessor core 102, the global snap signal 138 causes data existing in designated functional registers at the time of snap to be captured and shifted into a shadow register. The state machine 124 then operates on logic in accordance with embodiments of the present invention to shift out the shadow scan data for the identified thread in each selected core 102.

In one embodiment, shadow scan configuration bits 122a are shifted into a shadow scan active register 126. State machine 124, operating in accordance with JTAG standard, will cause the shadow data to be output at TDO 135 from the designated thread running in each of the selected multiprocessing cores 102. In one embodiment, state machine 124 operates on a priority encoder 128 which interprets the shadow scan configuration bits in the shadow scan active register 126 to send a shadow scan execute signal 131 to the selected core. In the example illustrated in schematic 120, shadow scan configuration bits in shadow scan active register 126 identify core 0, core 3, and core 7 for shadow scan. In one embodiment, priority encoder 128 reads the shadow scan configuration bits in shadow scan active register 126. In one embodiment, the shadow scan configuration bits are read consecutively beginning with core 0. Since core 0 is selected for shadow scan, the priority encoder 128 sends a shadow scan enable signal 130 to multiprocessor core 0 102, executing a shadow scan through a scan chain of some known length from a shadow scan register positioned or located at a known position in the core. When the shadow scan data is output 132, it is routed through multiplexer (MUX) 134 to TDO 135.

In one embodiment of the invention, when the shadow scan data is output for a selected core, state machine 124 executes a loop to continue to the next core. As described above, the shadow scan configuration bits in shadow scan active register 126 are read consecutively beginning with core 0. Once a shadow scan has been executed for a selected core, deactivation logic 130 is implemented to reset the core selection bit, effectively de-selecting a core once the shadow scan has been executed for that core. In this manner, core 0, in schematic 120, is de-selected by deactivation logic 130 after the shadow scan has been executed. Priority encoder 128 then reads the shadow scan active register 126 sequentially beginning with core 0, and the next selected core is core 3. In a similar manner as described above, priority encoder 128 sends a shadow scan enable signal 131 to multiprocessor core 3, 102, to execute a shadow scan through a scan chain of a known length from a shadow scan register in a known position in the core. The data is output at 132 and routed through MUX 134 according to control signal 136 to TDO 135. State machine 124 executes the loop for the next core. Deactivation logic resets the instruction bit corresponding to the just-scanned core 3, and priority encoder reads the shadow scan active register 126 for the next selected core which, in schematic 120, is core 7. In this manner, a shadow scan instruction is executed for each of the selected cores using the same instruction, in one embodiment.

Figure 2B:
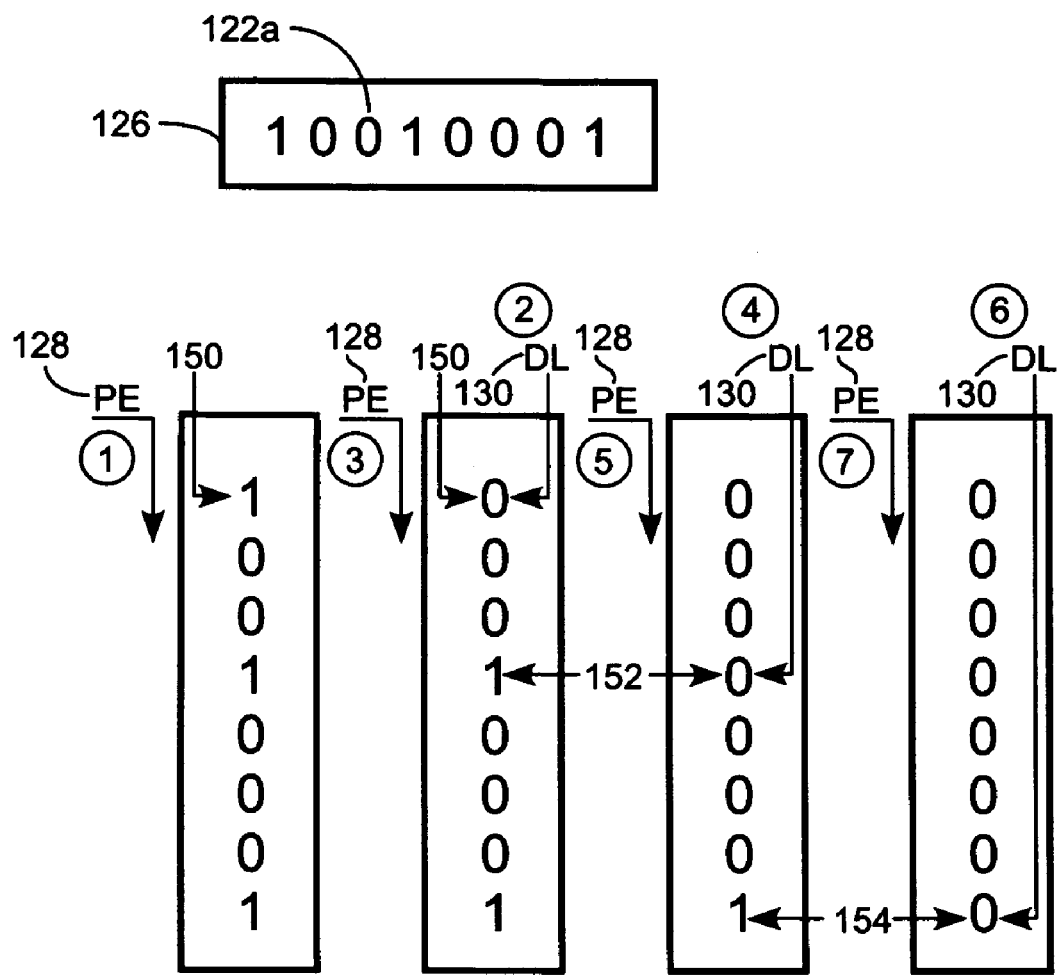
FIG. 2B is a detail view illustrating the sequential reading of the shadow scan configuration bits in accordance with one embodiment of the present invention.

FIG. 2B is a detail view illustrating the sequential reading of the shadow scan configuration bits in accordance with one embodiment of the present invention. As described above in reference to FIG. 2A, state machine 124 enables sequential reading of shadow scan configuration bits 122a stored in shadow scan active register 126 so that each selected core, up to all cores in the multi-core chip 100, are shadow scan enabled by a single instruction. As shown in FIG. 2B, shadow scan configuration bits 122a are loaded into shadow scan active register 126. In the illustrated example, cores 0, 3, and 7 are selected for shadow scan. Priority encoder 128 reads the shadow scan active register 126 at step ①  and the first identified core is core 0 shown at 150. At the completion of the shadow scan of core 0, deactivation logic 130 resets the bit for core 0 shown at 150 in step ②. Priority encoder reads the shadow scan active register 126 again at step ③, and the next selected core is core 3 shown at 152. At the completion of shadow scan for core 3, deactivation logic 130 resets the bit for core 3, shown at 152, in step ④. Priority encoder once again reads the shadow scan active register 126 at step ⑤, and encounters the next selected core, shown as core 7 at 154. At the completion of shadow scan of core 7, deactivation logic 130 resets the bit for core 7, 154, at step ⑥, and priority encoder 130 once again reads the shadow scan active register 126 having no more selected cores, and the shadow scan for the selected cores is complete.

Figure 3A:
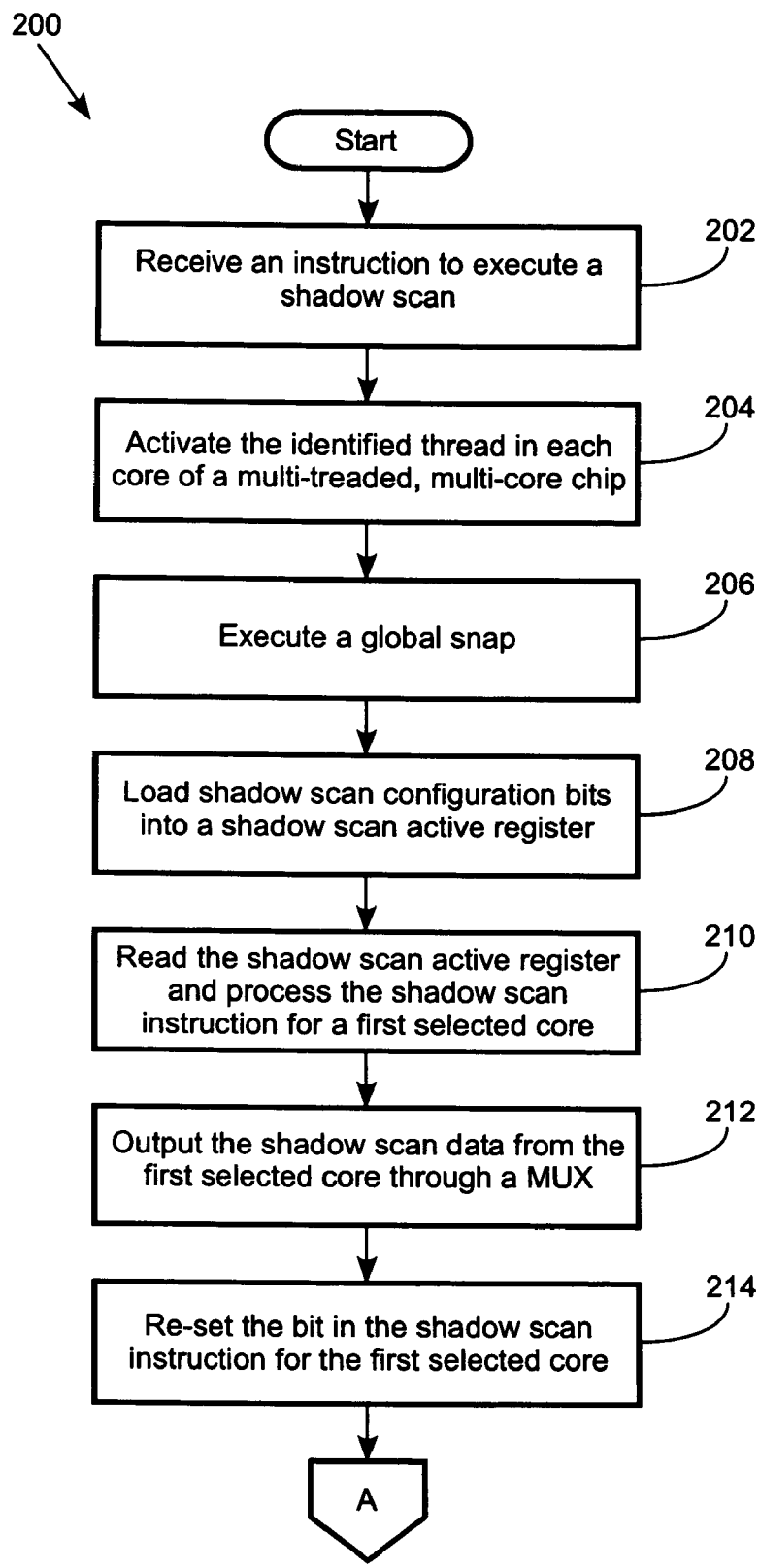
FIG. 3A is a first sheet of a flowchart diagram illustrating the method operations for processing a shadow scan instruction in a multi-threaded, multi-core environment in accordance with one embodiment of the present invention.

FIG. 3A is a first sheet of a flowchart diagram 200 illustrating the method operations for processing a shadow scan instruction in a multi-threaded, multi-core environment in accordance with one embodiment of the present invention. In method operation 202, an instruction to execute a shadow scan is received. In one embodiment of the invention, the instruction is a 14-bit word having at least three fields including an 8-bit shadow scan configuration, a 2-bit thread definition, and a 4-bit shadow scan instruction. The instruction is received into the instruction register of the TAP controller.

The method continues with operation 204 in which the shadow scan instruction is read in the TAP, and a thread is identified. In one embodiment, the shadow scan instruction is executed for a selected thread of a selected core or cores, up to all of the cores in a multi-threaded, multi-core environment. In operation 204, the selected thread is determined, and the thread is activated in all of the cores of the multi-core chip.

Next, in operation 206, a global snap command is executed by the TAP, capturing functional register data into shadow registers for designated flops of interest in all of the cores of the multi-core chip.

The method continues with operation 208 in which the shadow scan configuration bits are loaded into a shadow scan active register. In one embodiment, the shadow scan active register is an 8-bit register which is applied to a priority encoder identifying selected cores for shadow scan. By way of example, if a core in the multi-core environment is selected for shadow scan, it's shadow scan active register bit might be set to one, and if the core is not selected for shadow scan, it's shadow scan active register bit might be set to zero.

In operation 210, the shadow scan active register is read, and a shadow scan instruction is processed for a first selected core. As described above in reference to operation 208, the shadow scan active register is applied to the priority encoder. The first bit encountered identifying a core for shadow scan initiates the shadow scan instruction for the selected core.

In accordance with an embodiment of the invention, the priority encoder sends a shadow scan enable signal to the selected core. The signal remains enabled until the desired shadow scan data is output from the selected core. In one embodiment of the invention, the shadow scan signal for the selected core is enabled until the desired shadow scan register data is obtained for the selected core.

Once the desired shadow scan register data is obtained for the first selected core, the shadow scan data is output through a MUX to TDO.

In method operation 214, the bit in the shadow scan active register corresponding to the first selected core, the core just scanned, is reset so that the core is no longer selected to be scanned. In one embodiment, deactivation logic controlled by the state machine of the TAP effects the bit reset. The method then proceeds through connector "A" to the second sheet of flowchart diagram 200.

Figure 3B:
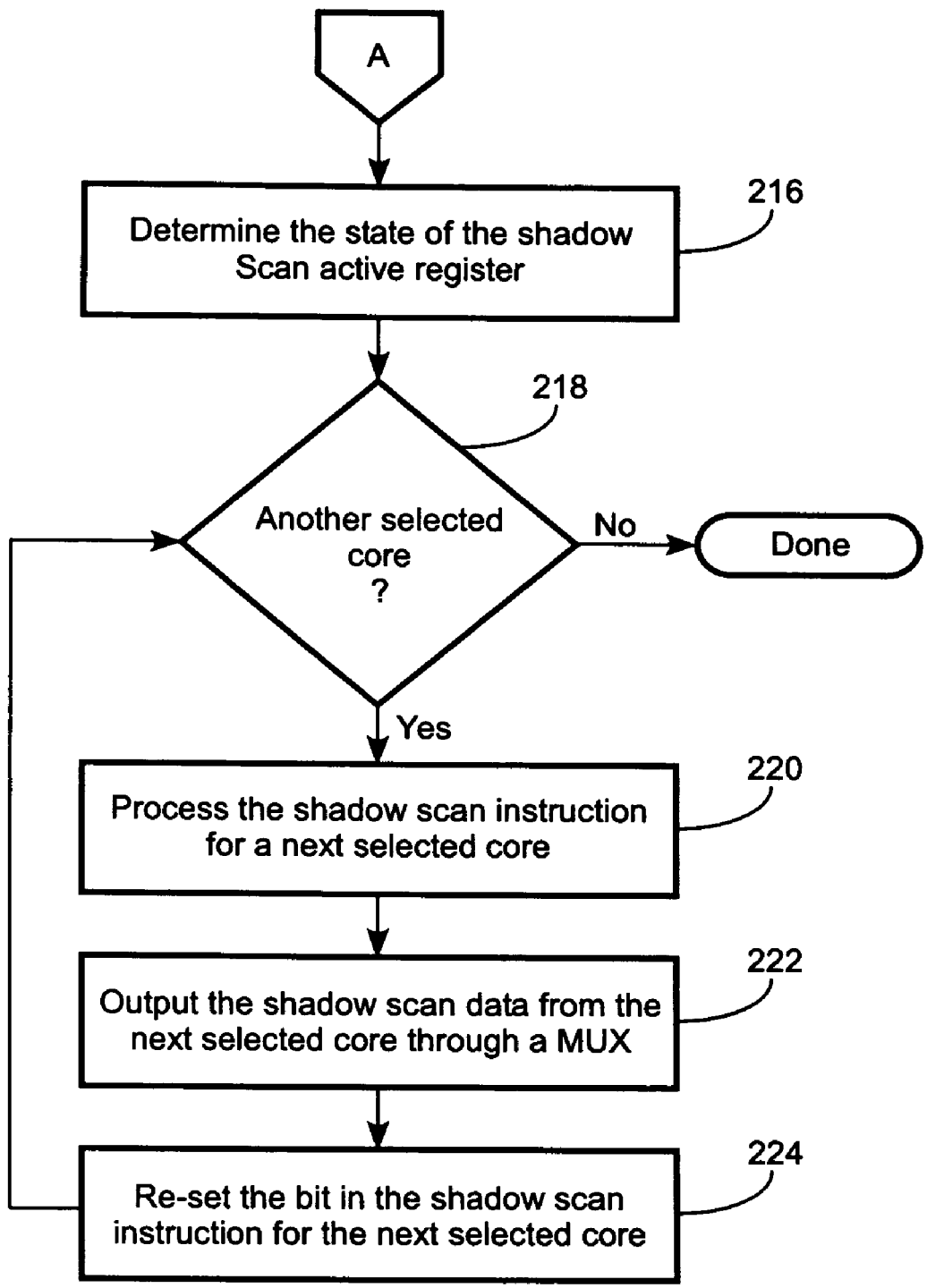
FIG. 3B is the second sheet and conclusion of flowchart diagram illustrating the method operations for processing a shadow scan instruction in a multi-threaded, multi-core environment in accordance with one embodiment of the present invention.

FIG. 3B is the second sheet and conclusion of flowchart diagram 200 illustrating the method operations for processing a shadow scan instruction in a multi-threaded, multi-core environment in accordance with one embodiment of the present invention. Continuing through connector "A," the method proceeds with operation 216 where the state of the shadow scan active register determines the next shadow scan chain to be shifted. As described above, the processing of a shadow scan instruction in accordance with embodiments of the present invention includes processing a shadow scan instruction through each selected core of a multi-core chip without having to load separate instructions for each core. In operation 216, the shadow scan active register identifies the next shadow scan chain to be shifted.

The method then continues with decision block 218 where it is determined whether another core is selected. If there is no additional core selected, a "No" to decision block 218, the method is done. If there is another core selected, a "Yes" to decision block 218, the method proceeds to method operation 220.

In one embodiment of the invention, method operations 220, 222, and 224, define essentially the same operations described above in operations 210, 212, and 214, for the next selected core. The shadow scan instruction is processed for the next core in operation 220 with the priority encoder sending a shadow scan enable signal to the selected core for as long as necessary to obtain the shadow scan data from the shadow scan registers wherever located in the selected core. The obtained shadow scan data is output through the MUX in operation 222, and the shadow scan instruction bit in the shadow scan active register is reset for that next selected core that was just scanned. In one embodiment of the invention, the state machine, defined by and compliant with JTAG standard, executes the desired loop operation under user control until the shadow scan instruction is processed for each selected core. When no more cores are selected for shadow scan, an "No" to decision block 218, the method is done.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing a shadow scan instruction in a multi-threaded microprocessing environment, comprising:

reading a shadow scan instruction that includes a thread identifier and a plurality of core identifiers, the plurality of core identifiers being assigned a state to identify microprocessor cores of a multi-core structure in which a shadow scan operation is to be executed, the thread identifier defined to select a thread running in the identified core, and processing through the selected thread of the identified cores is defined through the shadow scan instruction;

processing the plurality of core identifiers, each of the plurality of core identifiers being analyzed to determine if the shadow scan operation is to be executed through a selected thread running in each identified core; and sequentially examining the plurality of core identifiers, if the examination indicates that the identified core is active, proceeding with executing the shadow scan operation of the identified core through the selected thread running in the identified core, and moving to the examination of the next core identifier of the shadow scan instruction; and if the examination indicates that the identified core is not active, moving to the examination of the next core identifier of the shadow scan instruction.

2. The method of claim 1, further comprising:

executing a global snap instruction, the global snap instruction causing a copying of data in each of a plurality of designated functional registers into an associated plurality of shadow scan registers located in each microprocessor core of the multi-core structure.

3. The method of claim 1, further comprising:

resetting the core identifier after the processing of the shadow scan instruction through the selected thread of the identified core.

4. The method of claim 1, wherein the processing of the shadow scan instruction through the selected thread of the identified core results in an output for the identified core.

5. The method of claim 4, further comprising:

routing the output of each of the identified cores through a multiplexer.

6. The method of claim 5, further comprising:

outputting an accumulation of outputs of executed shadow scan operations routed through the multiplexer.

7. The method of claim 1, wherein the processing of the shadow scan instruction is performed in conjunction with a controller that executes a state machine.

8. The method of claim 7, wherein the state machine operates the processing upon receipt of the bit sequence.

9. A circuit including logic for processing a shadow scan instruction in a multi-threaded environment, comprising:

a controller for loading a shadow scan instruction that includes a thread identifier and a plurality of core identifiers, the plurality of core identifiers being assigned a state to identify one or more cores in which a shadow scan is to be executed, and the thread identifier identifying a thread running in each identified core, wherein processing of each of the plurality of core identifiers is defined through the shadow scan instruction;

a shadow scan active register for holding the plurality of core identifiers received from the controller;

a priority encoder to manage analysis of the plurality of core identifiers in the shadow scan active register and to interface with from one to a plurality of cores, the priority encoder sequentially interprets each of the plurality of core identifiers to send a shadow scan execute signal to the identified core to perform a shadow scan operation, wherein the identified core is running the identified thread; and deactivation logic being interfaced with the shadow scan active register and configured to receive control from the controller and feedback from the priority encoder.

10. The circuit of claim 9, further comprising:
a state machine configured to execute the processing of the shadow scan instruction through the identified one or more cores in which the shadow scan operation is to be executed.

11. The circuit of claim 9, further comprising:
a multiplexer for routing a result from each of the identified one or more cores in which the shadow scan operation is executed.

12. The circuit of claim 11, further comprising:
circuitry connecting the priority encoder and the multiplexer, wherein the priority encoder is configured to control the multiplexer to output an accumulation of results from each of the identified one or more cores in which the shadow scan operation is executed.

13. The circuit of claim 9, wherein the controller is configured to execute a global snap instruction through each core of a multi-core structure.

14. A computer readable medium having program instructions for processing a shadow scan instruction in a multi-threaded microprocessing environment, the computer readable medium comprising:
program instructions for receiving a shadow scan instruction that includes a thread identifier, a plurality of core identifiers, the plurality of core identifiers being assigned a state of one of selected and not selected for each of a corresponding microprocessor core of a multi-core structure, the thread identifier designating a thread running in each of the identified core;
program instructions for activating the designated thread in all the cores of the multi-core structure;
program instructions for processing the plurality of core identifiers, each of the plurality of core identifiers being analyzed to determine the state; and
program instructions for sequentially examining each of the plurality of core identifiers,
if the state is selected, proceeding with execution of a shadow scan operation through the designated thread running in the corresponding microprocessor core, and moving to the examination of the next core identifier; and
if the state is not selected, moving to the examination of the next core identifier.

15. The computer readable medium of claim 14, further comprising:
program instructions for executing a global snap instruction, the global snap instruction causing a shifting of data in each of a plurality of designated functional registers into an associated plurality of shadow scan registers located in each microprocessor core of the multi-core structure.

16. The computer readable medium of claim 14, further comprising:
program instructions for resetting a core identifier having a selected state after the processing of the shadow scan instruction through the designated thread of the corresponding microprocessor core.

17. The computer readable medium of claim 14, wherein the processing of the shadow scan instruction through the thread of the corresponding microprocessor core results in an output for the corresponding microprocessor core.

18. The computer readable medium of claim 17, further comprising:
program instructions for routing the output of each of the corresponding microprocessor cores through a multiplexer.

19. The computer readable medium of claim 18, further comprising:
program instructions for outputting an accumulation of outputs of shadow scan operations routed through the multiplexer.

20. The computer readable medium of claim 14, wherein the processing of the shadow scan instruction is performed in conjunction with a controller having a state machine configured to execute the processing of the shadow scan instruction upon receipt of the shadow scan instruction.

* * * * *